3,160,985
POLYMERIC COMPOSITION AND METHOD FOR TREATING PLANTS THEREWITH TO SUPPLY MOISTURE
Carl S. Ferguson, Fort Lauderdale, and Roland D. Earle, Hollywood, Fla., assignors to A. E. Staley Manufacturing Company, Decatur, Ill., a corporation of Delaware
No Drawing. Filed Jan. 29, 1962, Ser. No. 169,638
30 Claims. (Cl. 47—1)

This invention relates to a method and polymeric composition for supplying moisture to plants as required or maintaining moisture in plants by preventing or retarding its loss by evaporation or otherwise.

It is necessary in the nursery business to transplant numerous trees, bushes and plants which must be kept alive and healthy during the period from the digging to the replanting. The successful dormant storage of live plants (trees, bushes, etc.) depends largely upon proper and uniform moisture application and maintenance in the plant or its root system throughout the storage period, which may extend over a period of up to six months or longer. In dormant storage of plants it is customary to place sphagnum moss, shingle tow, or other packing material about the roots or the entire plant, and to saturate this packing material with water frequently, in order to maintain a suitable condition of humidity. In other instances the required humidity is maintained by automatic springling with water at short intervals, or by frequent watering by manual means. The use of bulky, space-requiring packing materials limits the number of plants which may be stored in a given area. Further, the use of such materials results in shipping parcels that are heavy and bulky. While the use of these bulky materials may be avoided by using the gum-like composition described in Patent Number 2,720,726, the enumerated gum-like materials do have drawbacks. For example, natural gums lack uniformity; they are expensive and susceptible to attack by bacteria, fungi, etc. Because of this lack of uniformity, plant-treating compositions based on natural gums tend to vary from batch to batch in their water absorbing and water retention properties, in the adhesion of the treating composition to the plant, etc. Accordingly, it is relatively difficult to predictably formulate the most effective composition for individual requirements. Further, plant-treating compositions based on carboxymethyl cellulose yield brittle films, and the films themselves have relatively poor adhesion to plants, especially during handling, and their water absorption properties while satisfactory for many purposes leave much to be desired. Also, the properties of the natural gums are limited, and do not have the desirable versatility of synthetic materials. Further, the wilting of cut flowers, the drying and consequent splitting of the ends of cut logs, and the destruction of foliage under severe conditions such as cold and hot winds, present kindred moisture-retention problems, and these cannot be solved using the natural gums.

The principal object of this invention is to provide synthetic resin compositions having uniform, tailor-made water-absorbing and water-retaining properties, resistance to bacteria, lack of toxicity to plants, economy and versatility of manufacture, compatibility with other ingredients used for treating plants, the resin composition being advantageous for the dormant storage of plants, for the preservation of cut flowers, for the preservation of foliage, and, in general, wherever moisture loss is a problem. The term "plant" is used in this specification to be inclusive of bushes, flowers, shrubs, foliage, trees, grass, etc.

In one aspect, this invention is a process of treating a plant with an aqueous composition comprising a non-toxic polyhydric alcohol humectant and a salt of a hydrolyzed preformed addition polymer of an alpha, beta-ethylenically unsaturated ester, amide or nitrile.

In another aspect, this invention is an aqueous composition having a pH of 4.5 to 9.5 comprising water, a non-toxic polyhydric alcohol humectant and a salt of a hydrolyzed preformed addition polymer of an alpha, beta-ethylenically unsaturated ester, amide or nitrile.

In somewhat greater detail, a water-retentive treating composition in accordance with this invention comprises a salt of a hydrolyzed preformed addition polymer of an alpha, beta-ethylenically unsaturated ester, amide or nitrile and a polyhydric alcohol humectant, wherein said polymer comprises from 5 to 86 weight percent of the combined dry weight of the humectant and polymer. The plant treating composition should have the following characteristics: (1) it is non-toxic to plants, (2) an aqueous formulation has a sufficiently high viscosity that it will not run off the nursery stock as applied and yet have sufficient fluidity to permit its application by spraying, (3) its films should have a minimum of stickiness and adhesiveness, (4) its films are capable of absorbing water applied by flooding (preferably the increase in thickness of the film due to water absorption is evident to the naked eye) and yet resist removal from the plant surface at the same time, and (5) an applied film has a sufficiently low tensile strength that small amounts of film may be removed without danger of removing large areas of the film. The polymeric acid salt gives the plant treating composition sufficient viscosity and adhesion so that a relatively thick layer of water-retaining composition adheres to the plant. On the other hand, the humectant supplements the water retention properties of the polymeric salt, improves the consistency of the treating composition and moderates the stickiness or tack of the polymeric acid salt in such a manner that the treating composition has a sufficient degree of adhesion to cause the composition to adhere as a layer of substantial thickness to the plant surface and yet not adhere to another treated plant surface. Prior to use, the polymeric acid salt can be compounded with materials necessary or useful for plant growth or preservation, such as plant food, a source of oxygen, hormones, insecticides, fungicides, etc.

The coating and plant form a structure wherein the coating acts as a water reservoir from which the plant is able to draw water. A somewhat more detailed discussion of the water reservoir coatings and their dependence on the cation portion of the polymeric material is set forth below. Accordingly, the plant has a much longer storage life. Further, the plant suitably coated can be transported without packing the plant in peat or other material.

THE POLYMERIC CONSTITUENT

The polymeric constituent of this invention is a hydrolyzed addition polymer of an alpha, beta-ethylenically unsaturated ester, amide or nitrile, whose salts are viscous at low total solids concentration. Preferably, a 5% by weight aqueous solution of the polymeric acid salt should be a thick gel, which, when dried, does not show tackiness if rubbed between the fingers. The gel should be different from that formed from gelatin in that it is soft and capable of being cut, as with a spatula, and, when cut, it flows together behind the cutting instrument.

The polymeric acids of this invention are prepared by the total or partial hydrolysis of preformed addition polymers of alpha, beta-ethylenically unsaturated esters, amides or nitriles. These are distinct from polymers of monomeric alpha, beta-ethylenically unsaturated acids, which are the subject of copending application, Serial No. 169,637, filed on even date. The present invention is especially useful to those who do not have polymerization facilities since there is available a wide variety of potentially hydrolyzable homopolymers and copolymers. The present invention has great versatility, as well, for from any particular hydrolyzable polymer it is possible to prepare a "tailor-made" series of polymeric resins that vary only in the number of carboxyl groups per monomeric unit.

Representative polymeric acids include completely or partially hydrolyzed homopolymers of acrylonitrile, acrylamide, alkyl acrylates, such as ethyl acrylate and 2-ethylhexyl acrylate, dialkyl itaconates such as dimethyl itaconate, etc., and copolymers of acrylonitrile, acrylamide, alkyl acrylates, dialkyl itaconates, dialkyl maleates such as dimethyl maleate, dialkyl fumarates such as dimethyl fumarate, etc., with one or more copolymerizable ethylenically unsaturated monomers such as ethylene, styrene, vinyl toluene, propylene, isobutylene, butadiene, vinyl acetate, vinyl chloride, vinylidene chloride, vinyl methyl ether, vinyl ethyl ether, divinyl benzene, etc.

The majority of polymeric materials can be hydrolyzed using conventional alkaline conditions such as described in U.S. Patent 2,727,835 in order to yield polymeric acids having on an average 0.05 to 2.0 carboxyl groups per monomeric unit. Polymeric acids based on the hydrolysis of (1) addition polymers of itaconate esters preferably contain on an average 0.1 to 1.2 carboxyl groups per monomeric unit, (2) addition polymers of fumarate and maleate esters preferably contain on an average 0.2 to 1.0 carboxyl group per monomeric unit, and (3) addition polymers of monofunctional esters, amides and nitriles preferably contain on an average 0.1 to 0.5 carboxyl group per monomeric unit.

As is well known, polymeric materials based on methacrylic acid esters are quite resistant to hydrolysis except under rather drastic conditions. Accordingly, as a practical matter, polymeric acids based on copolymers of allyl methacrylates are rarely employed unless the alkyl methacrylate is a copolymer with an ethylenically unsaturated monomer containing a more readily hydrolyzable amide, ester or nitrile group.

THE HUMECTANT

As pointed out above, the salts of the polymeric acids of this invention are used with a non-toxic polyhydric alcohol humectant in order to enhance the water-retaining properties of the polymer and thus to lower the polymer's already low rate of moisture loss. The humectant makes it possible to regulate the rate at which water is supplied to a coated plant. The non-toxic polyhydric alcohol humectants also have the properties of advantageously modifying the adhesive properties of the polymeric acid salt to plant material, of plasticizing the film of polymeric salt and of improving the consistency of the plant treating composition. These materials also have a lubricating effect on the plants, which imparts softness and flexibility to the plant surface even after much of the moisture in the composition has been lost by evaporation. Accordingly, the complete drying of the plant does not take place even after prolonged storage. The humectant can be added to the polymeric acid salt or conversely the polymeric acid salt can be added to the humectant.

The non-toxic polyhydric alcohol humectants have sufficient hydroxyl groups to be reasonably water soluble. Further, they are capable of absorbing water from the atmosphere, but are not sufficiently hygroscopic to dehydrate plant tissue; they are also capable of retaining water over a wide range of humidity. One or more of the following polyhydric humectants can be used advantageously in this invention: Propylene glycol, hexylene glycol, solid polyoxyethylene glycols having molecular weights in excess of about 1,000, liquid polyethylene glycols having a molecular weight less than about 1,000, hydroxyethyl starch, alkaline hypochlorite oxidized starch, carboxyethyl starch, sodium carboxymethyl cellulose, polymethylene glycols, etc. Treating compositions containing mono and disaccharides, such as dextrose and maltose, are less desirable because the coatings formed from such compositions tend to adhere to the coatings of other plants. Glycerol should be used with caution since under some conditions it may be detrimental to plants due to its dehydrating action on growing plants.

NEUTRALIZED COMPOSITION

While virtually any water-soluble, alkaline material can be used to neutralize the polymeric acid, the choice of alkali depends upon the ultimate application and type of plant coating desired. Ammonium hydroxide and the alkali metals, such as potassium hydroxide and sodium hydroxide, are the preferred sources of alkali. If a continuous film, which functions primarily as a barrier against loss of water (Type I composition), is desired, a volatile alkali such as ammonium hydroxide, is used as the neutralizing agent for the polymeric acid composition. After application to the plant, the ammonia is evolved from the coating layer as it dries prior to evolution of a significant amount of water. Since ammonia evaporates first from the exposed surface of the film, the evaporation seals the surface of the coating so that subsequent loss of moisture from the plant surface (and the film) is minimized. Generally, ammonium hydroxide neutralized compositions are used for treating cut flowers, cut log ends, evergreens, etc. For example, a composition comprising an ammonium salt of a partially hydrolyzed polymer of ethyl acrylate having on an average 3 carboxyl groups per monomeric unit and hexylene glycol when properly diluted and applied by dipping or spraying and then allowed to dry, forms a clear, water-resistant, continuous elastic film, which suppresses loss of moisture from cut flowers, such as lily heads, for periods several times longer than heretofore commercially possible. Furthermore, as is apparent, the clarity and gloss of the film enhances the natural beauty of the flowers. A similar composition may be applied to foliage of plants, such as evergreens, to retard evaporation from the leaves and subsequent possible injury, induced by cold or hot winds, etc. Again, the film enhances the appearance of the plant. Another important application of such compositions is in connection with the foliar feeding of deciduous shade trees, particularly those situated where root feeding is impractical, as for example, trees bordered by streets or pavements. The polymeric composition in this case serves as a carrier for plant nutrients in solution as well as for compatible fungicides and insecticides. The carrier film extends the effective life of the plant food, etc., since it is not readily removed by rain. On the contrary, such a film absorbs water from rain without being washed off readily, thereby providing water and nutrients in solution over a longer period than would be possible by spraying with aqueous solutions of the nutrient.

The ammonium salt of a completely hydrolyzed copolymer of a dibasic acid ester, such as a dialkyl fumarate or dialkyl maleate, with a second ethylenically unsaturated monomer also possesses additional desirable properties. For example, a completely hydrolyzed copolymer of ethylene and a dialkyl maleate deposited from aqueous ammonia solution possesses unusually high water absorption and, when compounded with a polyoxyethylene glycol, it is advantageously used for treating plants. The partially hydrolyzed esters of such dibasic acid ester addition polymers are also of considerable value. For example, a partially hydrolyzed copolymer of dibutyl itaconate, ethyl acrylate and methyl methacrylate has been determined to be effective in preventing the dehydration of the canes of packaged dormant roses. The rose canes are first dipped in a dilute ammonical solution of the copolymers and, while still wet, are dipped into a dilute solution of ammonium zirconyl carbonate. The second dip causes instantaneous drying and curing of the copolymer film to such an extent that it can be handled readily even with less than ordinary care. On further drying in ambient air a clear, plastic, moisture-barrier results which substantially prevents dehydration of the canes, and yet permits normal growth after transplanting. This material is of special value for packaged roses which may be kept on open display for sales purposes for long periods of time, and this technique preserves the roses longer than application of only an ammonical solution of polymer.

In the above uses where a continuous water barrier-type film is desired, the addition polymer preferably comprises from about 30 to 86 weight percent of the combined dry weight of polymers and humectants. While these compositions can be applied to any part of a plant (dormant, growing or cut), it is preferable that compositions having these relatively small proportions of humectant not be used to treat the bare roots of dormant plants.

Compositions based on hydrolyzed polymeric acids neutralized with non-volatile alkali, particularly sodium or potassium hydroxide, function in a somewhat different manner from compositions based on polymeric acids neutralized with volatile alkali. On plants, the films of the latter (Type I compositions) serve primarily as barriers against the loss of moisture and secondarily as moisture reservoirs, but the moisture content of the films is not easily renewable because the exposed surface is relatively impervious. On the other hand, the former compositions (Type II, using non-volatile alkali) form swellable coatings on the plant which readily absorb externally applied moisture, thereby acting primarily as a moisture reservoir and secondarily as a barrier against moisture loss. Type II compositions retain their water-absorptive surfaces. The compositions based on polymeric acids neutralized with non-volatile alkali, are most efficacious in the treatment of the roots of dormant plants. Roots are preferentially treated with the potassium salt of the polymeric acid, since potassium is recognized as a major plant food and there is less possibility of toxicity to the plant than from the sodium salt. Generally, in this use the polymeric material comprises from 5 to 35% of the combined dry weight of the polymeric material and humectant.

Although compositions based on polymeric acids neutralized with volatile alkali can be expected to form barrier Type I films, the addition of optional ingredients, which contain ionizable salts such as sodium and potassium, can convert the plant treating composition to swellable Type II compositions or a balance of properties may be obtained. For example, a plant treating composition based on the ammonium salt of a partially hydrolyzed ethyl acrylate polymer, which has been compounded with the sodium salt of dithiocarbamic acid (a fungicide sold as Vancide 51), form a swellable Type II composition which is suitable for the treatment of dormant roots.

OPTIONAL ADDITIVES

As pointed out above the properties of the plant coatings can be advantageously augmented by after-treatments with polyvalent metal compounds, such as ammonium zirconyl carbonate. Increased water resistance of the coating by cross-linking of the carboxyl groups of the polymer with polyvalent metal ions may also be attained by incorporating the metal ions in the plant treating composition itself. In this case, the metal ion must remain in solution or in an inactive state until the composition has been applied to the plant. One very convenient method of keeping the metal ion inactive is to use an ammonium complex, such as a zinc or zirconium ammonium complex. Another method is by incorporating a volatile solvent, such as an alcohol, for any possible reaction product of the metal ion and polymeric acid. The cross-linking effect or insolubilization takes place as the metal complexing agent or solvent for the cross-linked polymer evaporates from the surface of the coating. The excess aqueous ammonia used in complexing the metal is, for the purpose of this description, included in the term "solvent."

Desirable properties may also be conferred on the plant treating composition by the incorporation of one or more metal chelates, such as a zinc, iron, copper or manganese chelate of a sugar acid, such as gluconic acid or glucoheptonic acid. For example, a dilute ammonium hydroxide solution of a 30% hydrolyzed homopolymer ethyl acrylate and hexylene glycol, forms, in the presence of a soluble zinc salt, such as a zinc glucoheptonate, a film that absorbs water more readily and retains the absorbed water longer, than like films without the zinc chelate. Chelates are also valuable for supplying trace minerals to the plants, such as manganese, zinc and iron.

If the composition, as made up for application to plants, is found to be difficult to spread over the plant surface, such as over fine root hairs so as to cover them completely, a wetting agent may be added to promote such spreading. Any non-toxic wetting agent, such as dioctyl sodium sulfosuccinate, can be used for this purpose.

In the dormant storage of plants, the plant roots should be supplied with small amounts of oxygen. This may be accomplished by whipping air into the root treating composition. A more effective way is to include a peroxide such as hydrogen peroxide, magnesium peroxide, calcium peroxide, etc., in the composition. In the composition of this invention these decompose at a relatively low rate providing oxygen over a long period of time.

In addition to the foregoing, we prefer to include, in compositions for treating growing and dormant plants, plant nutrients in the form of balanced plant foods or fertilizer supplying required nitrogen, phosphorous and potassium, and growth stimulating hormones such as naphthyl acetamide or the methylester of naphthyl acetic acid. Commercially available hormone substances which contain only about 0.02% to 0.04% active material, can be used alone or mixed with Vitamin $B_1$. Balanced water-soluble fertilizers are readily available. A good balanced fertilizer for root application contains about 7% nitrogen, 6% phosphoric acid, and 19% potash. Part or all of the potassium can be furnished as the non-volatile alkali used in neutralizing the polymer. The nutrients can include or consist of a suitable salt or salts, such as monocalcium phosphate, monobasic ammonium phosphate, monobasic potassium phosphate, dibasic ammonium sulfate, etc. The acid salts also can be used to adjust the pH of the treating composition to an acidic pH. For example, forest seedlings are preferably treated with a composition having a pH below about 5.5. Generally, the plant treating composition has a pH of about 4.5 to 9.5.

If an extended period of time for shipping or storage is expected, and especially if the plants are to be shipped or stored at a warm temperature, one or more preservatives should be included in the composition to inhibit attack on the plants by bacteria, fungi, insects, etc. (The polymeric material of this invention is inherently resistant to such damage.) The same preservatives are also advantageous for treating the foliage of growing plants. Some of the humectants, such as propylene glycol, and the various peroxides have some preservative activity. Various materials such as formalin, sodium propionate, sodium dithiocarbamate, sorbic acid, etc., which have specific activities may also be included.

For the purpose of this invention, all of the above optional ingredients may be thought of as being "plant beneficents."

APPLICATION OF THE PLANT TREATING COMPOSITION

The various ingredients of the plant treating composition are formulated with water at a total solids concentration of about 0.1% to 25%. The most desirable concentration varies with the particular use and mode of application. For example, a Type I composition is advantageously applied to ends of cut logs and to rose canes at a total solids concentration of about 10% to 20% or to the ball of earth surrounding the roots of a tree in transit at a concentration as low as 0.1%. Bare roots are advantageously treated with a Type II composition at a concentration of about 2% to 15%.

The resulting treating composition can then be applied to the plant by dipping the plant, by spraying, by brushing, etc. In general the treating composition is sufficiently viscous so that it does not run off the nursery stock as applied but instead forms a substantial layer. This substantial layer (film) (1) has a minimum of stickiness and tackiness, (2) is capable of supplying the plant with necessary moisture over an extended period of time, (3) is capable of absorbing more water by flooding as the water in the layer is depleted (preferably the increase in thickness of the film due to water absorption is visible to the naked eye) while at the same time resisting removal from the plant surface and (4) has a sufficiently low tensile strength that small amounts of film can be removed without danger of removing large amounts of the film.

The plant-treating composition can be packaged in aerosol containers for convenient home use. In this case, the humectant and polymeric acid salt are compounded with a solvent which is miscible with water and compatible with (not reactive with) the propellant. For example, it has been found that solvents, such as ethanol, propanol, and isopropanol, can be used with dilute ammonium hydroxide solutions of humectant and polymeric acid in conjunction with the conventional Freon propellants, such as trichlorofluoromethane (Freon-11) and dichlorodifluoromethane (Freon-12). Other propellants, such as nitrogen and nitrous oxide may also be employed. Any optional ingredients used in an aerosol formulation should be compatible with the miscible solvent. The miscible solvent and propellant may also be thought of as being "plant beneficents."

The following examples are merely illustrative, and should not be construed as limiting the scope of the invention.

Example 1

A plant treating composition was formulated by stirring 120 pounds (6.7% by weight total solids) of an ammonium salt of a partially hydrolyzed homopolymer of methyl acrylate having on an average 0.3 carboxyl group per monomeric unit into an aqueous polyoxyethylene solution which had been prepared by adding 200 pounds of water to 50 pounds of polyoxyethylene glycols (25 pounds Carbowax 1500 and 25 pounds Carbowax 600). Four-tenths pound balanced fertilizer (0.08 pound dry weight), 2.1 pounds Vancide 51 (0.63 pound dry weight), and 0.05 pound of a 30% aqueous hydrogen peroxide solution were stirred into the polymeric composition. The resulting composition was diluted with sufficient water to make 50 gallons.

The above composition was sprayed on the bare roots and stems of a number of rose bushes which were placed in dormant storage.

During storage, the bushes were flooded with water at monthly intervals. Six months later, in the spring, these bushes were shipped to a large number of lay individuals, having no formal or horticultural experience, in various parts of the United States. Over 93% of the rose bushes had bloomed the first summer even though planted after the normal planting season (from late July to early August).

Over 30,000 young citrus seedlings, which had been completely coated with the above composition, were transplanted during hot weather and under severe conditions without the loss of a single tree.

The above composition can be varied in the following manner:

Ammonium, potassium or sodium salt of a partially hydrolyzed homopolymer of methyl acrylate having on an average 0.3 carboxyl group per monomeric unit _____ 6–10 pounds (dry basis).
Polyethylene glycols _____ 40–60 pounds.
Balanced fertilizer _____ 0.05–3.0 pounds (dry basis).
Fungicide (Vancide 51) _____ 0.5–2.0 pounds (dry basis).
30% aqueous solution of hydrogen peroxide _____ 0.05 pound.
Water to make 50 gallons.

Other suitable hydrolyzed copolymers include the ammonium salts of partially hydrolyzed copolymers of 40 parts ethyl acrylate with 60 parts methyl methacrylate having on an average 0.2 carboxyl group per monomeric unit or the partially hydrolyzed copolymer of either 0.3 mole acrylonitrile or acrylamide with 0.7 mole methyl methacrylate having on an average 0.3 carboxyl group per monomeric unit.

Example 2

A composition suitable for the prevention of winter kill of evergreen and for preserving cut lilies is formulated, in the manner described in Example 1, with 40 pounds (dry weight) of the ammonium salt of a partially hydrolyzed copolymer of ethyl acrylate (25 mole percent) and methyl methacrylate (75 mole percent) having on an average 0.23 carboxyl group per monomeric unit; 20 pounds hexylene glycol in sufficient water to make 50 gallons. The addition of 1100 pounds isopropanol makes the above composition suitable for use in an aerosol dispenser when compounded with 400 pounds of a 50/50 mixture of Freon-11 and Freon-12 in a pressurized dispenser.

The above ingredients can be varied in the following manner:

Above poymeric salt _____ 40–60 pounds (dry basis).
Hexylene glycol _____ 10–40 pounds.
Water _____ 400–800 pounds.

Example 3

A composition suitable for treating the bare roots of dormant plants is formulated in the manner described in Example 1, with 6 pounds (dry basis) of the potassium salt of a partially hydrolyzed copolymer of methyl acrylate (20 mole percent) and methyl methacrylate (80 mole percent) having on an average 0.18 carboxyl groups per monomeric unit; 30 pounds polyethylene glycol; 2 pounds (dry basis) balanced fertilizer; 0.5 pound (dry basis) fungicide; and sufficient water to make 50 gallons.

The above formulation can be varied in the following manner:

Above Polymeric Salt _____ 6–15 pounds (dry basis).
Polyethylene glycols _____ 30–60 pounds.
Balanced fertilizer _____ 2–4 pounds (dry basis).
Fungicide (Vancide 51) ___ 0.5–2.0 pounds (dry basis).
Water to make 50 gallons.

Example 4

A composition suitable for treating lawns is formulated, in the manner described in Example 1, with 10 pounds (dry basis) of the potassium salt of a partially hydrolyzed copolymer of methyl acrylate (30 mole percent) and methyl methacrylate (70 mole percent) having on an average 0.27 carboxyl group per monomeric unit; 5 pounds hexylene glycol; 5 pounds oxidized starch; 2 pounds of a balanced fertilizer (dry basis); 0.5 pound of a fungicide (dry basis); 0.1 pound of magnesium peroxide; in sufficient water to make 50 gallons.

The above composition can be varied in the following manner:

Above copolymer _____ 10–20 pounds (dry basis).
Hexylene glycol _____ 5–10 pounds.
Oxidized starch _____ 5–10 pounds.
Balanced fertilizer _____ 2–6 pounds (dry basis).
Fungicide (Vancide 51) ____ 0.5–2 pounds (dry basis).
Magnesium peroxide _____ 0.1–1 pound.
Water to make 50 gallons.

The hexylene glycol in the above formulation may be replaced by a mixture of polyethylene glycols (equal parts of Carbowax 600 and Carbowax 1500). Likewise, the potassium salt of the above polymer may be replaced by the ammonium salt.

Example 5

A composition suitable for treating the roots of dormant plants is formulated, in the manner described in Example 1, with 3 pounds (dry basis) of a partially hydrolyzed ammonium salt of a copolymer of a dialkyl fumarate and ethylene having on an average 1 carboxyl group per monomeric unit; 40 pounds ethylene glycols; 1 pound (dry basis) balanced fertilizer; 0.5 pound (dry basis) fungicide; 0.1 pound magnesium peroxide; and sufficient water to make 50 gallons.

The above composition may be varied in the following manner:

| | |
|---|---|
| The above copolymer | 3–6 pounds (dry basis). |
| Polyethylene glycols | 10–60 pounds. |
| Balanced fertilizer | 1–3 pounds (dry basis). |
| Fungicide (Vancide 51) | 0.5–2 pounds (dry basis). |
| Magnesium peroxide | 0.1–1.0 pounds. |
| Water to make 50 gallons. | |

The above composition can be modified by the inclusion of 5 to 10 pounds (dry basis) of the polymeric salt of Example 1.

Example 6

A plant treating composition suitable for use in aerosol sprays was prepared, essentially by the method of Example 1, with 20 pounds (dry basis) of a partially hydrolyzed ammonium salt of a copolymer of methyl methacrylate (85 mole percent) and dialkyl itaconate (15 mole percent) having on an average 0.15 carboxyl group per monomeric unit; 10 pounds hexylene glycol; 200 pounds of water; and 200 pounds of isopropanol. The composition was compounded with 200 pounds of a propellant mixture of Freon-11 and Freon-12 in a pressurized dispenser.

The above composition is particularly suited for application to evergreens, stems of rose bushes, etc.

The above composition may be varied in the following manner:

| | |
|---|---|
| The above copolymer | 20–40 pounds (dry basis). |
| Hexylene glycol | 10–30 pounds. |
| Water to make 200–300 pounds. | |
| Isopropanol | 200–600 pounds. |
| Propellant | From 25% to 40% by weight of the plant treating composition. |

Example 7

Over 60 trees, both deciduous and evergreen types, were transplanted in full leaf during July, without apparent injury or set-back after the application of the composition of Example 1 to their roots and a composition of the type described in Example 2 to their leaves. Included among these trees were 30 to 40 foot high Douglas firs.

Since many embodiments of this invention may be made and since many changes may be made in the embodiments described, the foregoing is to be interpreted as illustrative only and our invention is defined by the claims appended heerafter.

We claim:
1. The method of supplying and maintaining plant moisture, which comprises coating at least part of a plant with a non-toxic, aqueous composition comprising water, a polyhydric alcohol humectant, and a salt of a hydrolyzed, preformed addition polymer of an alpha, beta-ethylenically unsaturated monomer having a hydrolyzable group selected from the class consisting of the ester group, the amide group, and the nitrile group, wherein said hydrolyzed addition polymer contains on an average 0.05 to 2.0 carboxyl groups per monomeric unit formed by the hydrolysis of said hydrolyzable group and wherein said hydrolyzed addition polymer comprises from about 5 to 86 weight percent of the combined dry weight of humectant and addition polymer.

2. The method of claim 1, wherein the cation of said salt is selected from the group consisting of ammonium, sodium, and potassium.

3. The method of claim 1, wherein said treating composition contains a member selected from the group consisting of a dissolved polyvalent metal compound, a fungicide, a source of oxygen, a preservative, a plant nutrient, a plant hormone and mixtures thereof.

4. The method of claim 1, wherein at least part of the humectant is hexylene glycol.

5. The method of claim 1, wherein at least part of the humectant is a polyoxyethylene glycol.

6. The method of supplying and maintaining plant moisture, which comprises coating at least part of a plant with a non-toxic, aqueous composition comprising water, a polyhydric alcohol humectant, and an ammonium salt of a hydrolyzed, preformed addition polymer of an alpha, beta-ethylenically unsaturated monomer, having a hydrolyzable group selected from the class consisting of an ester group, an amide group, and a nitrile group, wherein said hydrolyzed addition polymer contains on an average 0.05 to 2.0 carboxyl groups per monomeric unit formed by the hydrolysis of said hydrolyzable group and wherein said hydrolyzed addition polymer comprises from about 30 to 86 weight percent of the combined dry weight of humectant and addition polymer.

7. The method of claim 6, wherein the resulting plant is after-treated with a polyvalent metal compound in solution.

8. The method of claim 6, wherein said monomer is an alkyl ester of acrylic acid.

9. The method of supplying and maintaining plant moisture, which comprises coating at least part of said plants with a non-toxic, aqueous composition comprising water, a polyhydric alcohol humectant, and an alkali metal salt of a hydrolyzed, preformed addition polymer of an alpha, beta-ethylenically unsaturated monomer having a hydrolyzable group selected from the class consisting of the ester group, the amide group, and the nitrile group wherein said hydrolyzed addition polymer contains on an average 0.05 to 2.0 carboxyl groups per monomeric unit formed by the hydrolysis of said hydrolyzable group and wherein said hydrolyzed addition polymer comprises from about 5 to 35 weight percent of the combined dry weight of humectant and addition polymer.

10. The method of claim 9, wherein said monomer is an alkyl ester of acrylic acid.

11. The method of claim 9, wherein said preformed addition polymer is a copolymer of an alkyl ester of acrylic acid and an alkyl ester of methacrylic acid.

12. A non-toxic, water-retentive, plant-treating composition having a pH of from about 4.5 to 9.5 comprising water, a polyhydric alcohol, a plant beneficent, and a salt of a hydrolyzed, preformed addition polymer of an alpha, beta-ethylenically unsaturated monomer having a hydrolyzable group selected from the class consisting of the ester group, the amide group, and the nitrile group, wherein said hydrolyzed addition polymer contains on an average 0.05 to 2.0 carboxyl groups per monomeric unit formed by the hydrolysis of said hydrolyzable group and wherein said hydrolyzed addition polymer comprises from about 5 to 86 weight percent of the combined dry weight of humectant and addition polymer.

13. The composition of claim 12, wherein the cation of said salt is selected from the class consisting of ammonium, sodium, and potassium.

14. The composition of claim 12, wherein at least part of said humectant is hexylene glycol.

15. The composition of claim 12, wherein at least part of said humectant is a polyoxyethylene glycol.

16. The composition of claim 12, wherein said composition contains a propellant, a water-miscible solvent and is packaged in a pressurized dispenser.

17. The composition of claim 12, wherein the plant beneficent is a member selected from the class consisting of a dissolved polyvalent metal compound, a fungicide, a source of oxygen, a preservative, a plant nutrient, a plant hormone and mixtures thereof.

18. A non-toxic, water-retentive, plant-treating composition having a pH of from about 4.5 to 9.5 comprising water, a polyhydric alcohol humectant, and an ammonium salt of a hydrolyzed, preformed addition polymer of an alpha, beta-ethylenically unsaturated monomer having a hydrolyzable group selected from the class consisting of an ester group, an amide group, and the nitrile group, wherein said hydrolyzed addition polymer contains on an average 0.05 to 2.0 carboxyl groups per monomeric unit formed by the hydrolysis of said hydrolyzable group and wherein said hydrolyzed addition polymer comprises from about 30 to 86 weight percent of the combined dry weight of humectant and addition polymer.

19. The composition of claim 18, wherein said monomer is an alkyl ester of acrylic acid.

20. A non-toxic, water-retentive, plant-treating composition having a pH of from about 4.5 to 9.5 comprising water, a polyhydric alcohol humectant, a source of oxygen, and an alkali metal salt of a hydrolyzed preformed addition polymer of an alpha, beta-ethylenically unsaturated monomer having a hydrolyzable group selected from the class consisting of the ester group, the amide group, and the nitrile group, wherein said hydrolyzed addition polymer contains on an average 0.05 to 2.0 carboxyl groups per monomeric unit formed by the hydrolysis of said hydrolyzable group and wherein said hydrolyzed addition polymer comprises from about 5 to 35 weight percent of the combined dry weight of humectant and addition polymer.

21. The composition of claim 20, wherein said monomer is an alkyl ester of acrylic acid.

22. The composition of claim 19, wherein the preformed addition polymer is a copolymer of an alkyl ester of acrylic acid and an alkyl ester of methacrylic acid.

23. Plant material at least partially coated with a partially dry, non-sticky, adherent film of a non-toxic, water-retentive coating material, comprising a polyhydric alcohol humectant, and a salt of a hydrolyzed, preformed addition polymer of an alpha, beta-ethylenically unsaturated monomer having a hydrolyzable group selected from the class consisting of the ester group, the amide group, and the nitrile group, wherein said hydrolyzed addition polymer contains on an average 0.05 to 2.0 carboxyl groups per monomeric unit formed by the hydrolysis of said hydrolyzable group and wherein said hydrolyzed addition polymer comprises from about 5 to 86 weight percent of the combined dry weight of humectant and addition polymer.

24. The article of claim 23, wherein the cation of said salt is selected from the class consisting of ammonium, potassium, and sodium.

25. The article of claim 23, wherein said film contains a member selected from the group consisting of a polyvalent metal compound, a fungicide, a preservative, a source of oxygen, a plant nutrient, a plant hormone and mixtures thereof.

26. The article of claim 23, wherein at least part of said humectant is hexylene glycol.

27. The article of claim 23, wherein at least part of said humectant is a polyoxyethylene glycol.

28. Plant material at least partially coated with a partially dry, non-sticky, adherent film of a non-toxic, water-retentive coating material comprising a polyhydric alcohol humectant and an ammonium salt of a hydrolyzed, preformed addition polymer of an alpha, beta-ethylenically unsaturated monomer having a hydrolyzable group selected from the class consisting of the ester group, the amide group, and the nitrile group, wherein said hydrolyzed addition polymer contains on an average 0.05 to 2.0 carboxyl groups per monomeric unit formed by the hydrolysis of said hydrolyzable group and wherein said hydrolyzed addition polymer comprises from about 5 to 35 weight percent of the combined dry weight of humectant and addition polymer.

29. Plant material at least partially coated with a partially dry, non-sticky, adherent film of a non-toxic, water-retentive coating material comprising a polyhydric alcohol humectant and an alkali metal salt of a hydrolyzed, preformed addition polymer of an alpha, beta-ethylenically unsaturated monomer having a hydrolyzable group selected from the class consisting of the ester group, the amide group, and the nitrile group, wherein said hydrolyzed addition polymer contains on an average 0.05 to 2.0 carboxyl groups per monomeric unit formed by the hydrolysis of said hydrolyzable group and wherein said hydrolyzed addition polymer comprises from about 5 to 35 weight percent of the combined dry weight of humectant and addition polymer.

30. The article of claim 29, wherein said polymer is a copolymer of an alkyl ester of acrylic acid and an alkyl ester of methacrylic acid.

References Cited in the file of this patent
UNITED STATES PATENTS

| | | |
|---|---|---|
| 2,128,973 | Tisdale | Sept. 6, 1938 |
| 2,203,274 | Anderson | June 4, 1940 |
| 2,801,984 | Morgan | Aug. 6, 1957 |
| 2,870,037 | Converse | Jan. 20, 1959 |
| 2,875,555 | Thiegs | Mar. 3, 1959 |
| 2,923,692 | Ackerman | Feb. 2, 1960 |
| 2,957,834 | Moller | Oct. 25, 1960 |
| 2,971,292 | Malecki | Feb. 14, 1961 |
| 3,008,817 | Nickell | Nov. 14, 1961 |
| 3,025,252 | Jack | Mar. 13, 1962 |
| 3,037,881 | McDowell | June 5, 1962 |
| 3,045,394 | Coulter | July 24, 1962 |
| 3,058,940 | Rees | Oct. 16, 1962 |

OTHER REFERENCES

Condensed Chemical Dictionary, fifth edition, New York, Reinhold, 1956, pages 26, 40 and 41.